INVENTOR.
JOSEPH BURNSWEIG JR.,
LARRY H. O'BRIEN,
BY J. K. Haskell
ATTORNEY.

Dec. 19, 1967 J. BURNSWEIG, JR., ETAL 3,359,496

SINGLE SIDEBAND HIGH LEVEL RF MODULATOR HAVING SPECTRUM ADJUSTMENT

Filed March 25, 1966 4 Sheets-Sheet 2

United States Patent Office 3,359,496

Patented Dec. 19, 1967

3,359,496

SINGLE SIDEBAND HIGH LEVEL RF MODULATOR HAVING SPECTRUM ADJUSTMENT

Joseph Burnsweig, Jr., and Larry H. O'Brien, Los Angeles, Calif., assignors to Hughes Aircraft Company, Culver City, Calif., a corporation of Delaware Filed Mar. 25, 1966, Ser. No. 537,443
9 Claims. (Cl. 325—137)

ABSTRACT OF THE DISCLOSURE

A binary phase coder generates a bipolar amplitude adjusted waveform at radio frequency. A quadrature code generator accepts the coded waveform and decomposes the code into two quadrature components. A pair of high level modulators receives each quadrature component of the code and the radio frequency carrier in quadrature to be modulated and impresses the code on the carrier. The energies of the coded radio frequency carriers are recombined to produce the single sideband binary phase coded carrier. By amplitude or time variations of the binary code, the power spectrum can be adjusted to improve receiver correlation functions of high resolution radar systems.

This invention relates to modulators and more particularly to a single sideband, high level radio frequency modulator having spectrum adjustment.

In contemporary practice the filter and phasing methods are used for generating single sideband, hereinafter referred to as "SSB." Of the two methods, the phasing method is the more difficult to mechanize because it depends upon the accurate cancellation of radio frequency (RF) voltages, thereby rendering the phasing method complex and subject to adjustment. The main purpose of generating SSB is to diminish the bandwidth which the receiver must handle, thereby improving the sensitivity of the receiver to the transmitted signal. As is well known, the narrower the bandwidth which the receiver must handle, the less the desired information signal must compete with noise.

Amplitude modulation systems which generate double sideband contain the same signal information in both sidebands (i.e.: redundant signal information), and therefore the SSB method is highly suitable for use. Where amplitude modulation systems are employed, SSB is especially desirable to provide improved signal sensitivity through elimination of the redundant information present in the suppressed sideband.

In the realm of voice or other low frequency communication systems, variations on SSB techniques are employed, such as pure SSB, "Vestigial" SB, or SSB with suppressed carrier. Two United States patents issued in 1963 relevant to these techniques are "Compatible Single-Sideband Transmission" by B. F. Logan et al. Patent No. 3,058,203, and "Vestigial Sideband Transmission" by E. S. Grimes, Patent No. 3,083,337.

Some radar and communications systems utilize a form of pulse compression to increase the reception range of the information transmitted. However, SSB techniques are unknown in pulse compression systems. Pulse compression, as applied to radar applications, refers to the use of long coded pulses to increase the detection range and a decoding of the long pulse to provide range resolution and accuracy of a short pulse. Pulse compression is accomplished by modulating a long transmitted pulse and designing the receiver to act on the received modulation so as to "compress" it into a shorter time interval with a higher peak return. One modulation technique for accomplishing pulse compression is known as "pulse coding," where the transmitted pulse is coded and then the received pulse is correlated by some form of data processing, commonly using matched-filter techniques.

When pulse coding is used in pulse compression, the modulation takes the form of frequency, phase, or amplitude coding of the transmitted pulse. As a result of pulse coding, the transmitter transmits the full RF bandwidth of the coded pulse, and the receiver is sensitivity-limited because it must handle the full noise bandwidth. Time amplitude sidelobes are generated by pulse coding which interfere with the accurate range resolution capability of the receiver. Due to these undesired time sidelobes, contemporary practice is to employ sidelobe-weighting filters in the receiver to alter the sidelobe structure of the received correlated signals. To suppress the sidelobes, the time-weighted filter techniques employ a tapped delay line in the receiver which is three to four times the length of the original code and uses tap (amplitude) weighting, such that the weighted taps are summed to produce a delayed replica of the correlated pulse, while the sidelobes are cancelled in traversing the extended line.

This sidelobe weighting filter technique is highly complex, and presents an inefficient use of components and space. Frequently, the technique is not capable of reducing sidelobe distortions to a useable low level.

When pulse compression of the phase-coded type is employed in a high resolution radar system (i.e.: radar systems which use the radar information and data processing to produce photographic quality pitctures), the received and coded pulse is compressed and provides higher time resolution. But, narrow pulses imply broad bandwith. In such systems, the receiver bandwidth is difficult to obtain, so that in contemporary practice the wide bandwith receiver must be highly sophisticated to cope with the requisite resolution under the broad bandwidth burden. The correlation receiver must be designed to distinguish between coded pulses and the noise, and also discriminate one coded pulse from the succeeding pulses. As the code length increases, the longer must be the tapped delay line (correlator) thereby increasing complexity, and capacity to correlate accurately. No attempt appears to have been made to transmit high level and wideband phase coded signals by using SSB techniques.

A pulse compression system of the phase-coded type, using high level modulation and employing narrower bandwidth transmission in SSB form, has the capability to further extend the reception range by improving the minimum detectable signal and thereby increase receiver sensitivity.

Accordingly, it is an object of the present invention to provide a new and improved single sideband modulator.

Another object is to provide a single sideband modulator, capable of modulating high level RF power.

Yet another object is to provide an RF modulator which permits transmission of coded signals in single sideband form.

Still another object is to provide a single sideband RF modulator of the phasing type having spectrum adjustment.

An additional object is to provide a high level RF modulator having standard microwave components and multipactors for rapidly generating phase coded signals of the single sideband suppressed carrier form.

Briefly, the present invention according to one embodiment combines an amplitude adjusted binary phase coder, a wide bandwidth video quadrature generator and a pair of high level phase modulators in order to provide a high level, wide band, single-sideband, binary phase coded RF signal. The binary phase coder generates a bipolar amplitude adjusted time waveform at RF. The quadrature generator combines the binary phase coded RF with its amplitude weighting in synchronous quadrature detectors driven from an RF source. The quadrature wide bandwidth video is produced by phase shifting the RF source carrier prior to synchronous detection. The high level phase modulators are driven by the amplified wideband video signals in addition to being supplied with high level RF drive. The phase-shifted carrier is coupled to the waveguide junction having the high speed switch that is operated by the phase-shifted binary phase coded signal. With reference to the carrier signal, and depending upon where the phase reference is chosen, binary "1" pulse represents a zero degree phase shift in the carrier during this time interval bit, while a binary "0" represents a 180° phase shift in the carrier during the time of the low level pulse. When the RF energy enters each waveguide junction, the high speed switches, operating in accordance with the code signal, binary phase code the RF carrier at each waveguide junction.

The binary phase coded carrier signals at the outputs of each waveguide junction are coupled to a summing network, where the upper sideband frequencies cancel, and lower sideband frequencies add, and thereby generate a single sideband binary phase coded signal.

The above and other features, objectives and advantages of the present invention will appear from the following description of exemplary embodiments thereof and illustrated in the accompanying drawings wherein like reference characters refer to like parts and wherein.

Figure 1:
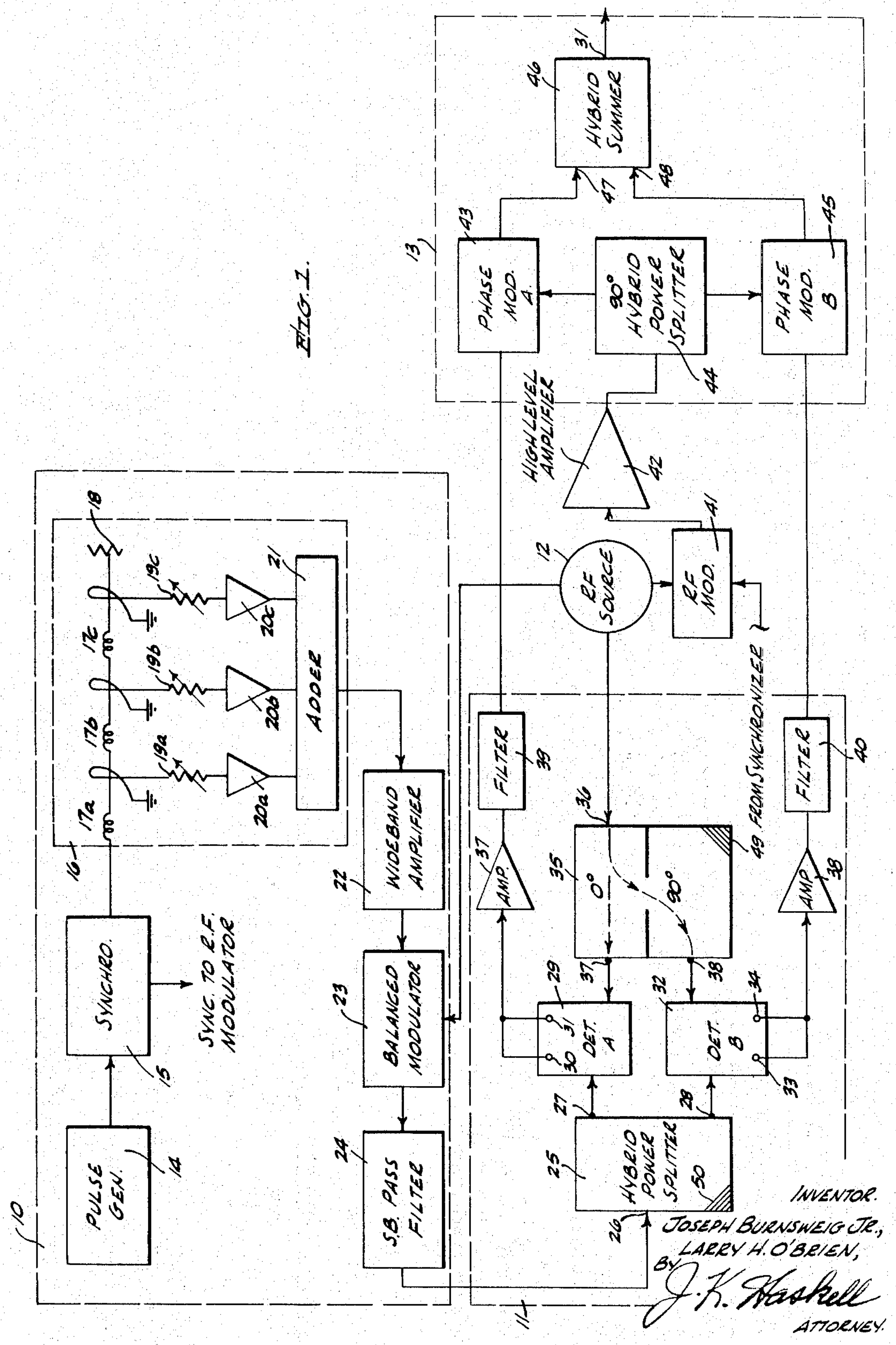
FIGURE 1 is a block diagram broadly illustrating the apparatus and method for generation of high level single sideband RF according to the principles of this invention.

FIG. 1 illustrates a system embodiment of a high level, single sideband, phase-coded RF generator. The coder 10 generates a pulsed RF wavetrain of wideband width binary code intelligence. The quadrature code generator 11 transforms the single coded RF signal into two coded video signals which are 90° out of phase and thus in quadrature. RF energy from the RF source 12 has three outputs: one output is supplied to the balanced modulator 23 in the coder 10 for use in double sideband code generation, a second output to the quadrature code generator 11 for synchronous detection, and a third output to the RF pulse modulator 41.

The high level modulator 13 includes two phase modulators 43 and 45, which are driven by the two quadrature coded video signals. These two quadrature coded signals perform quenching operations on multipactors within the phase modulators 43 and 45 of the high level modulator such that the RF energy, shifted by 90° from the hybrid power splitter 44, is modulated to produce a first binary phase-coded signal; the unshifted RF energy from the hybrid power splitter is modulated by the unshifted quadrature code signal to produce a second binary phase coded RF signal. Both of the binary phase coded RF signals are combined in the hybrid summer 46, where the upper sideband binary phase-coded signal components reinforce each other but the lower sideband signal components cancel, and thereby produce at the output 51 of the hybrid summer the wideband, single-sideband, high level, phase-coded RF energy.

The coder 10 includes a pulse generator 14 to generate a finite duration pulse which enters the synchronizer 15. The synchronizer 15 in turn generates a pulse to the RF modulator 41 so that the coder 10 and the RF source 12 operate in synchronism. Synchronizers are well known to those skilled in the art. The code generation circuit 16 is comprised of a delay line with bit delay pick-off points 17*a*, 17*b*, and 17*c* and the termination 18. Bit delay pickoff points 17*a*, 17*b* and 17*c* are preselected on the basis of the bit time delay interval desired. At each pick-off point there are potentiometers, 19*a*, 19*b*, and 19*c*, each of which are respectively connected to the amplifiers 20*a*, 20*b*, and 20*c* and each amplifier in turn is connected to the adder 21 wherein an appropriate train of coded pulses are generated. Each of the potentiometers 19*a*, 19*b*, and 19*c* may be either preset such that the pulses through each bit delay point 17*a*, 17*b*, and 17*c* are of equal amplitude or each set differently to change the amplitude. The amplifiers 20*a*, 20*b*, and 20*c* merely provide sufficient amplification levels in combination in the adder.

The output of the code generator 10 is a wideband RF code signal. However, it is desired to generate a high level RF signal sideband code and thus a wideband code in quadrature is required; i.e., of two types: a first code signal at 0° phase shift (reference), and a second code signal phase shifted 90° with respect to the first. Because of the difficulties inherent in the design of an amplifier which would give the exact code at all frequencies and two identical code signals which are in quadrature, the following method is used in this embodiment; however it is not intended as a limitation. Dual channel coders could also be used, but would introduce redundant circuits. After amplification of the code in wideband amplifier 22 the code is mixed with the RF signal in the balanced modulator 23 thereby producing both upper and lower sideband coded intelligence with the RF signal suppressed. Since there is upper and lower sideband code information which is redundant information, one sideband would be sufficient.

The sideband pass filter 24 is inserted to remove one sideband. It is a matter of choice as to whether the upper sideband or the lower sideband passes; however, either will satisfy the prerequisites for subsequent operations. It is to be noted that at this point (output of sideband pass filter 24) the coder output is a single sideband and wideband coded signal.

It is the function of the quadrature code generator 11 to generate the two wideband code signals in quadrature from the single sideband wideband code coming from the code generator 10. This single sideband, wideband code signal shall hereinafter be referred to as "the code." The code enters the hybrid power splitter 25, which may be of the magic tee type or any other hybrid power splitter which provides in phase outputs. One-half of the power 27 from the hybrid enters detector A29 while the other half of the power 28 enters detectors B32. RF energy from the RF source 12 enters a 90° power splitter 35 which delivers half the power at 0° phase shift to detector A while delivering the remaining half of the power, shifted by 90°, to detector B. Detectors A and B are well known in the art as synchronous detectors; the crystal output signals obtained from each modulator with a quadrature phase shift in the wideband code. The flat loads are well known in the art and used for matching purposes to ensure the desired operation and outputs of each of the hybrid power splitters. Thus the input video code to the amplifier 37 no longer bears the superimposed RF introduced at the balanced modulator because of the operation of video detector A. Similarly, the input code to amplifier 38 no longer bears the superimposed RF. However, the code signal into amplifier 38 is now phase shifted 90° (i.e.: in quadrature) with respect to the code signal at amplifier 37. Amplifiers 37 and 38 are of the distributed amplifier type and raise the code level to high level (power) code signals. Filters 39 and 40 remove any undesirable harmonics or sidebands. Now at the outputs of the quadrature phase code generator there are a first quadrature code signal and a second quadrature code signal at sufficient levels to operate the respective phase modulators. For example, assume the code to be 500 mc. bandwidth such as video and the RF energy source to be 10 gc. By mixing the 500 mc. with 10 gc., there is a frequency translation to 10.5 gc. and 9.5 gc. Filtering the lower sideband (9.5 gc.), and detecting at the quadrature code generator, the 500 mc. code (video) is restored, and a quadrature code is supplied as the wideband drive intelligence to the phase modulators.

Figure 3:
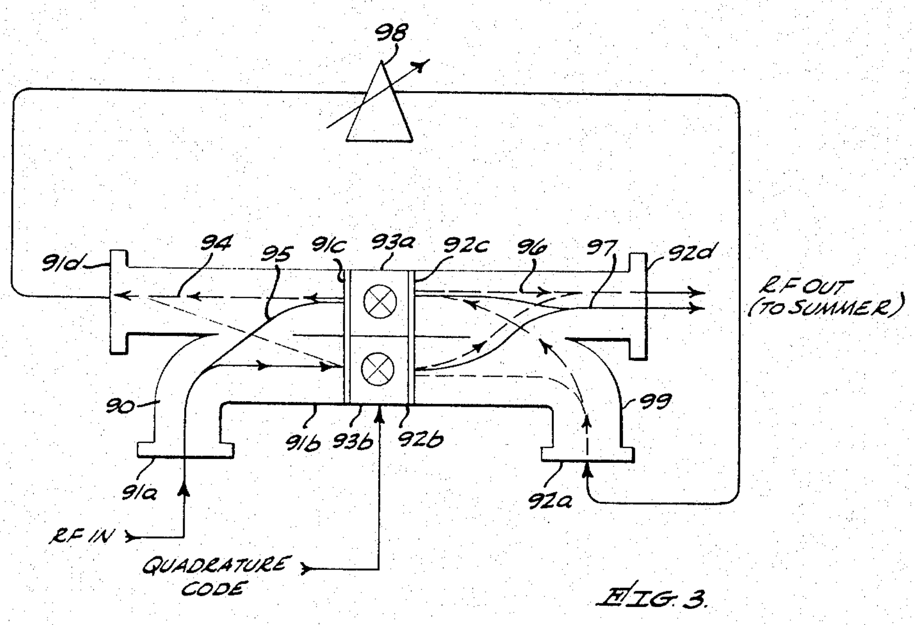
FIG. 3 is a schematic diagram of a high level, reciprocal type phase modulator used in an embodiment of the present invention.
Figure 2:
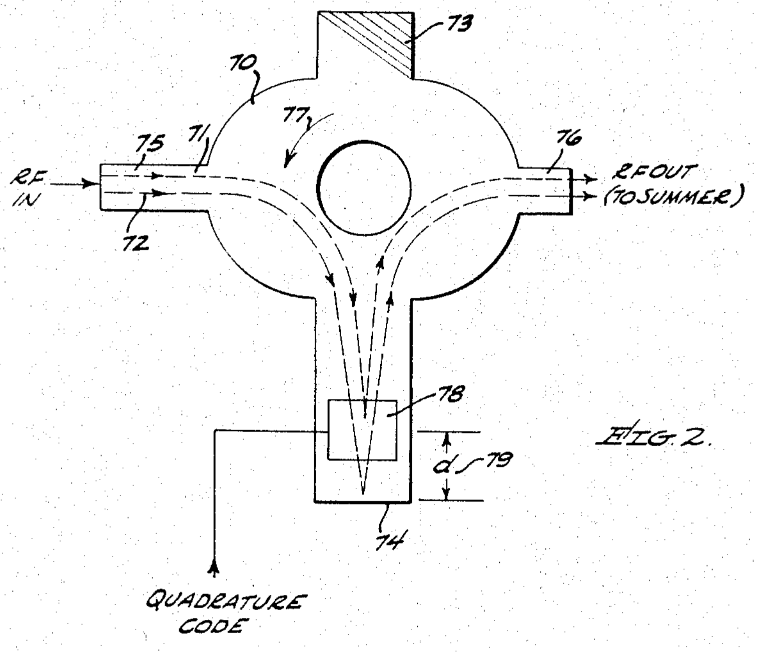
FIG. 2 is a schematic diagram of a high level nonreciprocal type phase modulator used in an embodiment of the present invention.

The phase modulators of the type preferred in the FIG. 1 system embodiment are shown in greater detail by FIGS. 2 and 3. Phase modulators A21 and B45 of FIG. 1 should be of the same type and thus both should be of the type shown in FIG. 2 or both should be of the type shown in FIG. 3. In FIG. 2 there is shown the non-reciprocal device 70 with an input port 75 connected to the RF source and a multipactor 78 being connected to the quadrature coded signal generated at the output of the distributed amplifier. Non-reciprocal waveguide devices suitable for use in the present invention, but not necessarily limited thereto, include three port circulators and four port circulators. A four port circulator is illustrated. The RF energy passes from the entry port 75 toward the multipactor 78 and depending upon the state of the multipactor, is either phase shifted 180° (by path length switching) or is reflected from the multipactor without any phase shift. Multipactors are well known to those skilled in the art and their high speed switching characteristics (nanoseconds) are described in an article entitled "Duplexing and Switching With Multipactor Discharges," by M. P. Forrer and C. Milazzo in the April 1962 Proceedings of the IRE. Slower speed switching devices such as gas discharge tubes, and their equivalents may also be used. In brief, the multipactor is known as a high vacuum device which exhibits the characteristic of secondary electron emission when RF energy is introduced into the interaction region. This secondary electron emission caused by impinging RF energy rapidly builds up an electron barrier such that RF energy instead of passing through the multipactor will be reflected from the multipactor. This electron barrier can be controlled by applying a voltage to the multipactor to quench the electron emission. In the quenched state RF energy will pass through the multipactor whereas in the unquenched state RF energy is reflected.

When the quadrature code is applied to the multipactor 78 and if the code is a plus pulse, no phase change (0° reference) will occur; i.e., the RF energy reflects from the multipactor. However, when the quadrature coded pulse is negative (−), a 180° phase change occurs; i.e., RF energy passes through the multipactor 78 and reflects from the reflective short 74. This process of 0° and 180° phase changes on a RF carrier is commonly known as "binary" phase coding. This type of coding as well as other types will be discussed later in the specification. Of course, the position of the multipactor in the port is at a distance "*d*" (79) from the reflective short 74 so that a 180° phase change is introduced. The distance "*d*" (79) is a function the waveguide wavelength and the amount of phase shift to be imparted to the RF carrier impinging upon the multipactor. Thus, if distance "*d*" is equal to $$\left(\frac{n}{2}+\frac{1}{4}\right)\lambda g$$

where $\lambda g$ is the waveguide wavelength (plus some correction for the multipactor reactance component), then the phase change will be $2\pi n-\pi$ radians (substituting $2\pi$ for $\lambda g$), which is an effective phase change of 180°. But other degrees of phase change are possible by adjusting the distance of the multipactor within the port. The path 72 illustrates RF energy which is shifted in phase by 180° by passing through the multipactor to the RF output port 76. Path 71 illustrates the 0° reference phase of RF energy reflected by the multipactor to the output port 76. The matched impedance 73 is inserted in one port of the four port circulator illustrated and is necessary to ensure proper operation as a binary phase coding device.

As previously mentioned both phase modulators should be of the same type. If both are the circulator (non-reciprocal) hybrid type, then the quadrature RF carrier from each of the exit ports will be phase coded according to the synchronized quadrature code. The two binary phase-coded RF carriers in quadrature are then summed and result in high level, single sideband, wideband, binary phase-coded RF.

FIG. 3 illustrates the use of reciprocal type hybrid junctions which may be used as the phase modulator in an embodiment of the present invention. A Riblet short slot hybrid is shown, but as is well known to those skilled in the art, the "analog" of a reciprocal device can be comprised of a combination of non-reciprocal devices. The operation of only one device as a phase modulator, shown in FIG. 3, is herein described. However, at least two short slot devices are necessary according to the principles of the present invention. One part of the quadrature RF energy from the 90° power splitter enters the first hybrid 90 through the entry port 91*a* where the energy again splits into two equal portions. One portion of the split energy is directed toward a port 91*b* while the other portion of the split energy (shifted 90° in phase) is directed toward a port 91*c*. In response to the quadrature code applied to the multipactors 93*a* and 93*b*, which also have input terminals located at ports 91*b* and 91*c*, the RF energy will either pass through the multipactors into the complementary hybrid 99 or be reflected toward output port 91*d* of first hybrid 90. The multipactors 93*a* and 93*b* are operated in parallel by the quadrature code, and thus obtain the same state simultaneously in accordance with the code applied.

These parallel operated multipactors 93*a* and 93*b*, or other devices capable of high speed switching, shall hereinafter also be referred to as the "switching device." If the switching device 93*a* and 93*b* is in a quenched state, as determined by the quadrature code pulse, the RF energy passes through the switching device through ports 92*b* and 92*c* into hybrid 99. If the switching device is not quenched, the RF energy is reflected from the switching device toward port 91*d* of first hybrid 90, where the RF energy recombines. The path 94 illustrates the RF energy motion in the first hybrid 90 during an unquenched state of the switching device; the path 95 illustrates the RF energy motion in the first hybrid 90 during a quenched state of the switching device.

Assuming an unquenched state of the switching device, the RF energy exits at port 91*d*, and is routed through a phase shifter 98. This phase shifter 98 may be a fixed length of line or other suitable phase shift device, or may be a variable phase shift device. To "binary" phase-code the RF energy, the phase shifter 98 is preset to impart a 180° phase shift to RF passing through it. Thus the phase shifted RF passes from the phase shifter 98 into hybrid 99 via entry port 92*a*. The path 96 illustrates the energy motion in hybrid 99 when the switching device is in an unquenched state. As path 96 shows, the phase shifted RF enters at entry port 92*a*, splits into equal portions with one portion again phase shifted 90° by characteristics of the hybrid, reflects from ports 92*b* (90 degree phase shift) and 92*c* and recombines at exit port 92*d*.

It is to be noted that due to the characteristic of the short-slot hybrid (or other quadrature hybrids) the RF energy at exit port 92*d* has recombined, but this recombined RF energy has an additional −90° phase shift as well as being binary phase coded. This phenomenon produces an unbalanced input to the hybrid summer 46

(FIG. 1) from the channel using the combination of unshifted quadrature RF and unshifted quadrature code. To compensate for the undesired and imbalanced summer input, a 90° phase shifter is inserted between the phase modulator A43 and the hybrid summer 46 shown in FIG. 1.

At the same time that pulsed RF energy enters the high level phase modulators, coded quadrature video signals are applied to the control electrode of the switching devices. These video signals were generated at the same time interval, but have been processed such that their complex frequency components are in phase quadrature. A simplified drawing is indicated in 101 of the impressed binary code for a hypothetical RF carrier of 3 cycles. The code waveform 102 indicates the similar code; however, it is shifted 90° in phase.

Figure 4:
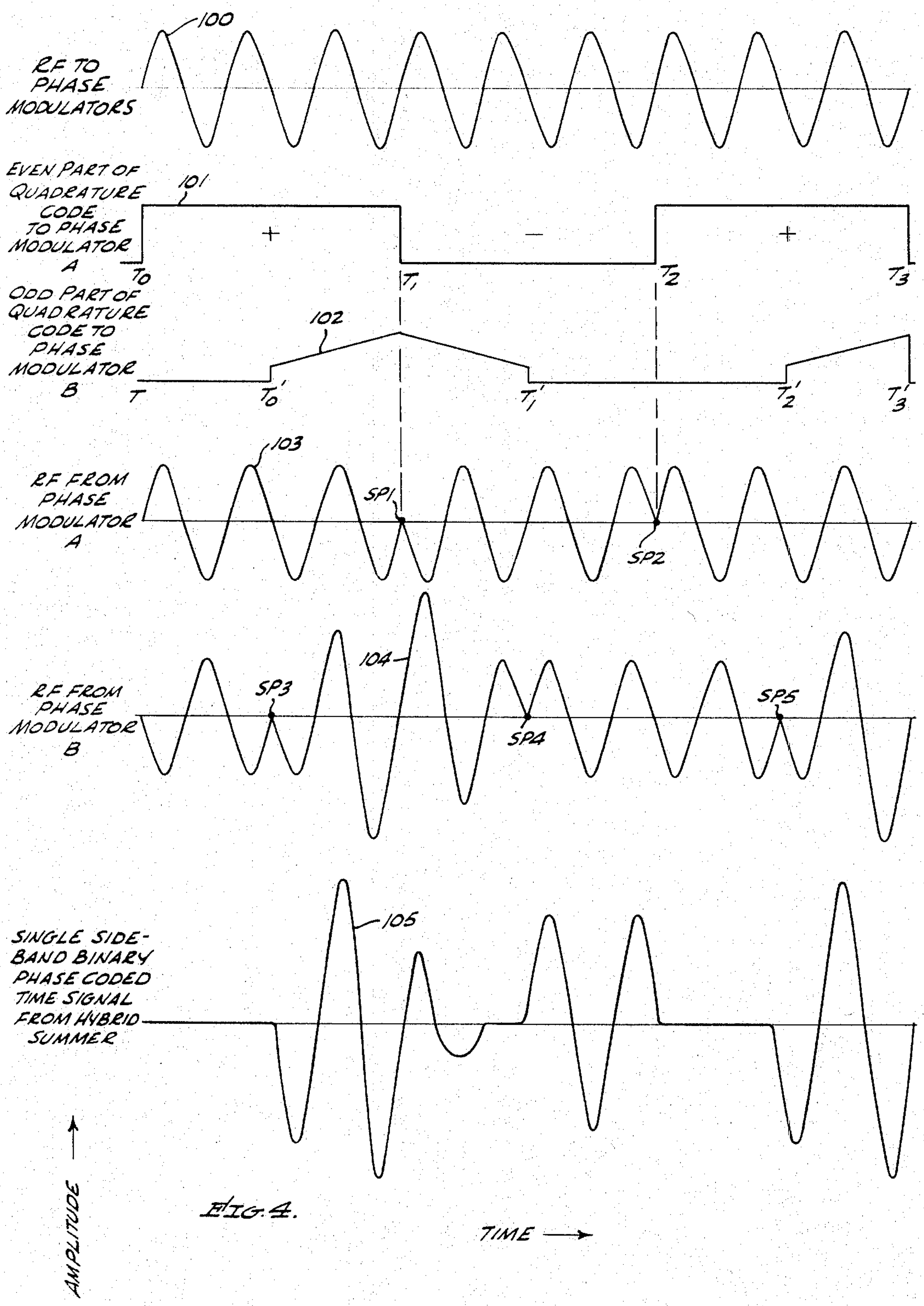
FIG. 4 is a diagram illustrating the relationship of the types of codes and RF waveforms as they appear according to the principles of the present invention.

Turning now to FIG. 4, there is shown a series of waveforms which may be used and generated in accordance with the principles of the present invention. These waveforms are best understood by also referring to FIGS. 1 through 3. Waveform 100 illustrates the RF carrier prior to coding by the RF phase modulator. As previously mentioned with regard to FIG. 1, the RF energy carrier supplied by the RF source 12 is passed through a 90° power splitter 44, which results in quadrature RF, i.e., one carrier being supplied at half power to phase-modulator A43 at 0° shift in phase (reference), while the carrier supplied to phase-modulator B45 is shifted by 90° also at half power.

At the same time that the RF energy enters the phase-modulators, a coded signal is simultaneously applied to the switching devices (multipactor) within the phase-modulators. Waveforms 101 and 102 represent the code applied to the respective switching devices in phase-modulators A and B. The frequency constituents of the time code waveform 102 are in quadrature (90° phase difference) with code waveform 101, due to the action of the quadrature code generator 11 described previously. The essential function of the quadrature code generator 11 is to decompose the original single sideband code into a "sine and cosine" type waveform parts, the "sine" part being even or symmetrical (i.e. waveform 101) and the "cosine" part being odd or asymmetrical (i.e. waveform 102).

The code waveforms shown are suitable for generation of binary phase coded RF. When the "+" state exists, it is considered a binary "1." When the "—" state exists, it is considered a binary "0." Thus, during the time intervals $T_0$ through $T_1$ also referred to as a "bit-time" interval, and $T_2$ through $T_3$ with reference to code waveform 101 the code is binary "1." Similarly, at code waveform 102, the bit-time interval $T_0'$ through $T_1'$ and $T_2'$ through $T_3'$ are binary "1's." Further, the bit-time interval $T_1$ through $T_2$ at code waveform 101 and the bit-time interval at 102 from $T_1'$ through $T_2'$ are binary "0's." With respect to the phase-modulator switching devices, the binary "1" represents the quenched state, while the binary "0" represents the unquenched state.

These code waveforms 101 and 102 are in the binary form "101" (+ — +), and "0101" (— + — +) respectively and referred to as the odd and even parts of the quadrature code elements. The number of bit times can be varied, to increase the code length, and may take an "even" (symmetrical) or "odd" form. "Odd" code forms refer to integers not evenly divisible by 2, and correspond to the previously mentioned even part of the waveform. Thus, a code of + — + — + (10101) is a code of five, and is odd. A code of + + — + + — (110110) is a code of 6, or even or symmetrical. For illustrative and convenience purposes the code waveform 101 has been chosen as a code of 3, and each bit-time interval corresponds to 3 cycles of the RF carrier. However, in other applications the switching time may be shorter or longer depending on the frequency of the carrier. A single cycle of the carrier may be used, corresponding to one bit-time interval. For instance, if the carrier were one (1) gc. (L-band), then one RF cycle corresponds to one nanosecond. Similarly, a 5 gc. C-band RF carrier corresponds to 5 cycles per nanosecond. Thus, in the 1 gc. RF carrier example, 5 cycles also corresponds to 5 nanoseconds, 3 cycles to 3 nanoseconds, etc.

Among the codes for pulse compression, which are usable with the present invention, are the Barker codes described in "Group Synchronizing of Binary Digital Systems" by R. H. Barker, and "Communications Theory," both by the Academic Press, London, 1953. Also usable in the system of the invention are the codes of De Long described in "Experimental Auto Correlation of Binary Codes" by D. F. De Long, M.I.T., Lincoln Labs Report #47G0006 of Oct. 24, 1960. Polyphase codes, which are in the binary code form but with a variety of phase shifts may also be used in accordance with the system of the present invention. Polyphase codes are described in a paper by Robert L. Frank, titled "Polyphase Codes With Good Non-Periodic Correlation Properties," in IEEE Transactions on Information Theory, January 1963.

Analog codes which vary the amplitudes of the code waveforms may be used to adjust the phase coded single sideband spectrum. This will be discussed later in the specification.

In FIG. 4, the code waveform 101 becomes negative (—) at $T_1$, causing the switching device to assume an unquenched state and producing a phase reversal of 180° at RF carrier waveform 103 at switch point SP1. Three cycles later of the RF carrier waveform 103, the code waveform becomes plus (+), causing the switching device to be quenched at switch point SP2 and no phase reversal of the normal carrier occurs, but a phase reversal does occur relative to the prior condition of the switching device. Similarly, the code waveform 102 produces phase changes at RF carrier waveform 104 at switch points SP3 and SP4. Thus, the combination of quadrature operation of the codes to the RF modulators and the quadrature RF carrier produces binary phase coded RF carriers at phase-modulators A and B which are also in quadrature. These two binary phase coded quadrature RF carriers are then routed to the hybrid summer where they combine to produce the wideband, single sideband, binary phase coded signal shown at waveform 105. This single sideband signal at 105 is also at high level, because the coding was performed at the output of the RF source which was at a high power level, prior to splitting, and the power summed later at the hybrid summer. Some power loss does occur as result of the multipactor, but this loss can be reduced by employment of the phase-modulator shown in FIG. 3, which permits lower voltage level operation of the multipactors.

Figure 5:
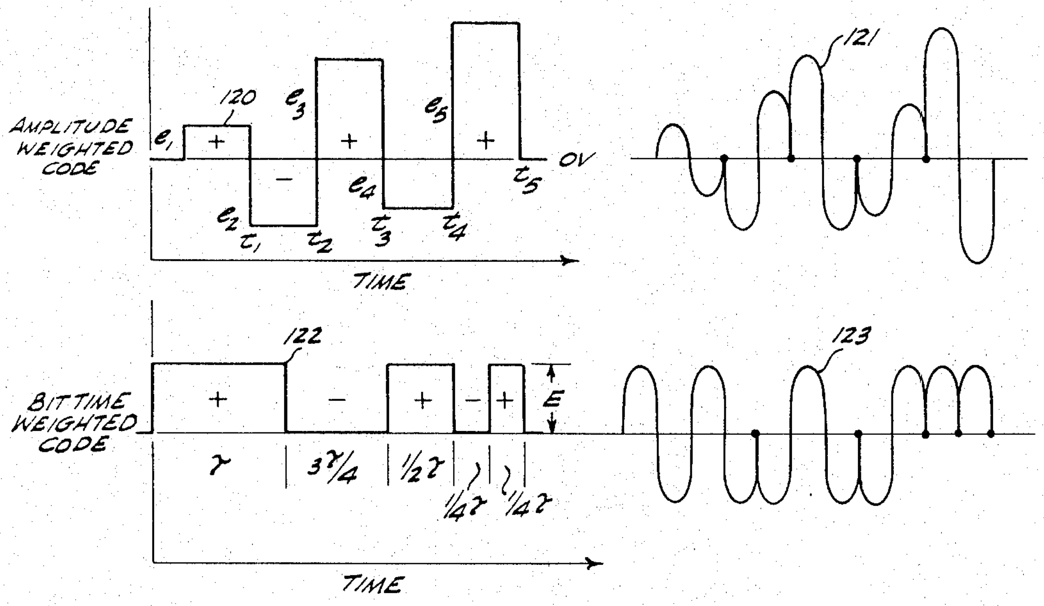
FIG. 5 is a diagram illustrating the types of codes and the coded RF waveforms which may be used in generating a spectrum adjusted single sideband phase coded signal at high level.

Referring to FIG. 5, there is shown a series of code waveforms and the resulting coded carriers which illustrate the "spectrum adjustment" capabilities of the present invention, and thereby improve the autocorrelation function of the receiver for the type of coded single sideband generated by this system.

As is well known to those familiar with single sideband generation principles, some attention must be given to the compatibility between the generation and reception (i.e., the receiver) end. Two articles by Donald E. Norgaard discuss these interrelated problems, "The Phase Shift Method of Single Sideband Signal Generation," and "The Phase Shift Method of Single Sideband Reception," both in the Proceedings of the IRE, December 1956.

It has been previously shown, that the system of the present invention permits the high level and single sideband generation of binary phase-coded RF energy, which implies a reduction in the bandwidth which the receiver would otherwise cope with (i.e., single sideband instead of double). Such reduction in bandwidth improves receiver sensitivity since the noise power within the receiver passband is smaller. Sensitivity of the received signal can be further improved by shaping the generated signal power spectrum (i.e., spectrum adjustment). This shaping of the power spectrum improves the autocorrelation function of a receiver, which is the capability to detect the signal in the presence of noise by increasing the peak autocorrelated output relative to the sidelobes or cross-correlation.

Autocorrelation refers to the automatic action at the receiver to correlate the received signals with the transmitted signals. In the system embodying the present invention, the generated SSB would be sampled by the receiver and held in "reserve" for comparing to the received signals. The presence of noise makes correlation necessary as well as the ability to take full advantage of the transmitted intelligence.

In statistical terms, which is the basic problem of receiver correlation, the pulse correlation function is expressed:

$$R(\tau)=1/T\int_0^T e_1,\ (t)e_2(t-\tau)d\tau$$

$R(\tau)$ represents the correlation function; $\tau$ is an incremental change across the pulse width; T is the total pulse duration, $e_1$ represents the comparing voltage, $e_2$ the second voltage being compared, and $t$ is some interval of time. Because the correlation function represents an integrated signal product and sum, the graphic representation will be a triangular shape. The highest correlation occurs when the T's of the transmitted pulse and the received pulse are superimposed. Also the sharper the rise of the correlation function, the more desirable it is. According to the principles of the present invention, the variables T, $e_1$, and $t$ are all predetermined by the code. With such knowledge, autocorrelation is simplified and increased receiver accuracy and sensitivity is assured.

It has been shown by D. A. Huffman in "Generation of Impulse-Equivalent Pulse Trains" in the Proceedings of the IRE, Information Theory, vol. I, September 1962, that it is theoretically possible to generate waveforms with a high autocorrelation function (i.e., a waveshape possessing a main response and a low secondary response).

In accordance with the principles of the present invention, two methods are utilized. A first method called "Time-Weighting" involves the alteration of the coding signal in the time domain, whereas the second method called "Amplitude Weighting" alters the coding signal in the amplitude domain. Of course, polyphase coding or combinations of time and amplitude domain alterations are also possible and would improve the autocorrelation function as well as increase code diversity (intelligence) in the generated RF energy.

The code waveform 120 illustrates a code of 5 in the binary form 10101, and is amplitude weighted. By changing amplitudes of the code pulses at each list time interval, such as the amplitude $e$, during $t_0$ through $t$, and amplitude $e_2$ during $t_1$ to $t_2$, etc., the binary phase coded RF carrier is also amplitude modulated. This amplitude and binary phase modulated RF carrier is shown at the waveform 121, which results from the code waveform 120; the RF carrier is shown for convenience to have one cycle per bit time. Operationally, the potentiometers shown in FIG. 1 are set at different levels so that the code pulse from each delay line pick-off points has a different amplitude. These varied amplitude pulses in the code waveform, are amplified, quadrature code generated, and cause varied operating levels of the multipactor. The varied levels of multipactor operation is possible due to the characteristic of the multipactor's reflection coefficient, and is a well known multipactor characteristic. This variation of reflection coefficient regulates the RF power through the phase coder in accordance with code levels and resulting in variations of the carrier amplitude.

It is to be understood in accordance with the principles of the present invention that the illustrated amplitude-weighted code 120 is the odd part of the two quadrature codes from the quadrature code generator. Similarly, the amplitude and phase modulated RF carrier waveform 121 represent only one of the quadrature outputs of the two phase modulators. No attempt is made to illustrate the resulting binary phase and amplitude coded single sideband signal, but it is to be understood that such would result, and the correlation function would be sharply peaked. The power spectrum would be at its maximum (peak) value (highest power) at the SSB frequency, with all other sidebands at minimum.

A second method of spectrum adjustment is illustrated by the bit time-weighted coded waveform 122 and the resulting carrier at waveform 123. The bit time-weighted code is a code of 5 or binary form 10101, but the pulse intervals are varied in the time domain. There is shown at the time-weighted code waveform 122, a pulse of "$\tau$" width (time), a second pulse $3\tau/4$, a third at $\tau/2$, and a fourth and fifth at $\tau/4$. The width "$\tau$" is chosen to correspond to two cycles of the RF carrier for illustrative convenience, and the code has a constant amplitude E. The coded RF carrier resulting from the bit-time weighted code is shown at waveform 123. This bit-time weighted code also results in a high correlation function; and the power spectrum is maximum at the desired SSB frequency, while the other sidebands are suppressed.

While several embodiments of the high-level, single sideband RF code generator have been illustrated and described, such is intended to be only illustrative of the principles of the invention, and not limiting in any sense.

What is claimed is:

1. A modulator system for generating a single sideband coded RF carrier at high level comprising:

- a quadrature coder means for receiving a wideband coded single sideband signal at its input for generating two high level coding signals, said coding signals being in phase quadrature with respect to each other;
- a high level modulator means coupled to said quadrature coder means and having an input capable of receiving two high level RF carrier signals, each RF carrier being of the same frequency and in phase quadrature with respect to each other, for modulating each of said RF carrier signals in accord with said coding signals; and
- a code generator means coupled to the input of said quadrature code generator means for generating a single sideband, wideband coded signal.

2. An apparatus for generating a coded single sideband RF carrier at high level, the combination comprising:

- a coder for generating a coded wideband single sideband signal having an RF carrier superimposed thereon;
- a quadrature coder for developing odd and even high level coding signals from the wideband single sideband coding signal, the odd and even coding signals being in phase quadrature with respect to each other, said quadrature coder being coupled to said coder; and
- a high level modulator for receiving a high level RF carrier signal, said high level modulator being coupled to said quadrature coder and for modulating the high level RF carrier signal in accordance with the high level coding signals.

3. In an apparatus for generating a coded single sideband RF carrier at high level according to claim 2, wherein said coder comprises:

- a code generator for generating a wideband coding signal of predetermined form;
- a balanced modulator coupled to said code generator and said balanced modulator including means for receiving an RF carrier signal of the same frequency as received by said high level modulator for modulating the coding signal with the RF carrier signal, whereby the modulation results in a wideband output signal containing the upper and lower sidebands of the coding signal of predetermined form; and a sideband pass means for passing only one sideband of the wideband output signal, said sideband pass means being coupled to said balanced modulator.

4. In an apparatus for generating a coded single sideband RF carrier at high level according to claim 2, wherein said quadrature coder comprises:

a power divider for dividing the energy of the coded single sideband signal into two equal portions, said power divider being coupled to said coder;

a radio frequency power splitter for receiving an RF carrier signal of the same frequency as received by said high level modulator and for dividing the RF carrier signal into a first and second equal energy portion, the first energy portion being in phase quadrature with respect to the second energy portion; and a detection means, said detection means including a first and second balanced detector coupled respectively to the first and second equal RF carrier energy portions of said power splitter, the first and second balanced detectors also being coupled to said power divider, for removing the RF carrier from each of said coded signal energy portions.

5. In an apparatus according to claim 2, wherein said high level modulator comprises:

a power divider, said power divider including means for receiving a high level RF carrier signal for dividing the power level of said RF carrier signal into a first and second equal energy output portion, the first portion being in phase quadrature with respect to the second portion;

a phase modulation means, including a first and second high level modulator means coupled to said power divider at the first and second equal energy output portions respectively, and also coupled to said quadrature coder, for modulating each energy portion of the RF carrier signal in accordance with the coding signals having the same phase quadrature relationship as the respective RF carrier signal; and a power adder for adding the modulated RF carrier energy, said power adding means being coupled to said phase modulation means.

6. In an apparatus for generating coded single sideband RF energy at high level in accordance with claim 5 wherein said phase modulation waveguide comprises:

a first non-reciprocal hybrid waveguide for carrying RF energy and having an entry port, an exit port, and an intermediate port, the ports being arranged so that a first RF carrier energy signal passes from the entry port in the direction of the intermediate port and toward the exit port;

a first multipactor positioned in the intermediate port of said first non-reciprocal waveguide, said first multipactor means being coupled to said quadrature coder and operating in accordance with the odd coding signal from said quadrature coder for impressing the code on RF energy passing through said first non-reciprocal waveguide;

a second non-reciprocal hybrid waveguide for carrying RF energy, having an identical port arrangement as said first non-reciprocal hybrid means and including means for receiving a second RF energy signal, the second RF energy signal being in quadrature with the first RF energy signal; and a second multipactor, coupled to said quadrature coder, and positioned within the intermediate port of said second non-reciprocal hybrid waveguide and including means for receiving said even coding signal from the quadrature coder for impressing the code upon RF energy passing therethrough.

7. In an apparatus for generating coded single sideband RF energy at high level in accordance with claim 5 wherein said power divider and said power adder are short-slot hybrid waveguides.

8. In a radar system having a source of RF carrier signal, an apparatus at the transmitter for generating a coded single sideband RF carrier at high level, comprising:

coder means coupled to said source of RF carrier signal for generating a pulsed RF wavetrain of wideband, single sideband, binary coded intelligence;

quadrature coder means coupled to said coder means and said source of RF carrier for translating said binary coded intelligence into first and second video frequency level coded intelligence signals, said translated coded intelligence signals being in phase quadrature with respect to each other;

hybrid power splitting means coupled to said source of RF carrier signal for providing first and second high level RF carrier signals synchronously with said coder means, said first and second RF carrier being in phase quadrature with respect to each other;

modulating means, including first and second phase modulators each phase modulator coupled to said quadrature coder and said hybrid power splitter, for impressing a binary phase code on each of said RF first and second carrier signals in accordance with the said first and second coded intelligence signals having the same quadrature relation as the respective RF carrier signal; and hybrid summing means coupled to said modulating means for combining both of the binary phase coded RF carrier signals into one binary phase coded RF carrier signal.

9. In an apparatus according to claim 8 wherein said coder means comprises:

pulse generator for generating pulses of predetermined width;

delaying means having a predetermined series of delays and coupled to said pulse generator for time duration spacing of said pulses;

amplitude weighting means coupled to said delaying means for varying the amplitude of the time-delayed pulses to predetermined amplitude levels;

adder means coupled to said amplitude weighting means for summing the delayed and amplitude varied pulses to produce a wavetrain of binary coded intelligence;

balanced modulator means coupled between said adder and said source of RF carrier signal for modulating said binary coded intelligence with said RF carrier signal, the modulating resulting in an RF wavetrain of wideband output signal containing the upper and lower sidebands of said binary coded intelligence; and sideband pass means coupled to said balanced modulator means for pressing only one sideband of said wideband output signal.

References Cited

UNITED STATES PATENTS 3,029,396 4/1962 Sichak ............ 332—45 X

RODNEY D. BENNETT, *Primary Examiner.*

C. L. WHITHAM, *Assistant Examiner.*